US008562853B2

(12) United States Patent
Leck et al.

(10) Patent No.: US 8,562,853 B2
(45) Date of Patent: Oct. 22, 2013

(54) TRACER-CONTAINING COMPOSITIONS

(75) Inventors: Thomas J. Leck, Hockessin, DE (US); Stuart C. Bricker, Wilmington, DE (US); Allen Capron Sievert, Elkton, MD (US)

(73) Assignee: E I du Pont de Nemours and Company, Wilmington, DE (US)

( * ) Notice: Subject to any disclaimer, the term of this patent is extended or adjusted under 35 U.S.C. 154(b) by 533 days.

(21) Appl. No.: 12/621,659

(22) Filed: Nov. 19, 2009

(65) Prior Publication Data

US 2010/0065772 A1 Mar. 18, 2010

Related U.S. Application Data

(62) Division of application No. 11/062,044, filed on Feb. 18, 2005, now Pat. No. 7,641,809.

(60) Provisional application No. 60/548,085, filed on Feb. 26, 2004.

(51) Int. Cl.
 *C09K 5/00* (2006.01)
 *C09K 5/04* (2006.01)

(52) U.S. Cl.
 CPC ............................... *C09K 5/045* (2013.01)
 USPC .......................................................... 252/67

(58) Field of Classification Search
 USPC .......................................................... 252/67
 See application file for complete search history.

(56) References Cited

U.S. PATENT DOCUMENTS

| | | | |
|---|---|---|---|
| 1,808,604 | A | 6/1931 | Kuenzli |
| 3,668,882 | A | 6/1972 | Sarsten et al. |
| 4,294,716 | A | 10/1981 | Saccavino et al. |
| 4,520,109 | A | 5/1985 | Simmonds et al. |
| 4,709,577 | A | 12/1987 | Thompson |
| 4,725,551 | A | 2/1988 | Thompson |
| 5,357,782 | A | 10/1994 | Henry |
| 5,369,983 | A | 12/1994 | Grenfell |
| 5,388,446 | A | 2/1995 | Kronberg |
| 5,409,839 | A | 4/1995 | Balestrieri et al. |
| 5,421,192 | A | 6/1995 | Henry |
| 5,444,102 | A * | 8/1995 | Nimitz et al. ................. 521/131 |
| 5,560,855 | A | 10/1996 | Hinton et al. |
| 5,681,984 | A | 10/1997 | Cavestri |
| 5,900,185 | A * | 5/1999 | Tapscott .......................... 252/67 |
| 5,918,269 | A | 6/1999 | Mahaffey, Jr. |
| 5,979,224 | A | 11/1999 | Cavestri |
| 6,025,200 | A | 2/2000 | Kaish et al. |
| 6,070,454 | A | 6/2000 | Cavestri |
| 6,070,455 | A | 6/2000 | Cavestri |
| 6,132,636 | A | 10/2000 | Singh et al. |
| 6,150,306 | A | 11/2000 | Friswell |
| 6,178,809 | B1 | 1/2001 | Cavestri |
| 6,183,663 | B1 | 2/2001 | Kalley et al. |
| 6,196,056 | B1 | 3/2001 | Ewing et al. |
| 6,214,624 | B1 | 4/2001 | Barker et al. |
| 6,248,890 | B1 | 6/2001 | Likavec et al. |
| 2003/0096419 | A1 | 5/2003 | Trigiani |
| 2005/0145822 | A1 | 7/2005 | Drigotas et al. |
| 2005/0211949 | A1 * | 9/2005 | Bivens et al. .................... 252/67 |
| 2005/0230657 | A1 | 10/2005 | Leck et al. |
| 2005/0242323 | A1 * | 11/2005 | Leck et al. ....................... 252/68 |

FOREIGN PATENT DOCUMENTS

| | | |
|---|---|---|
| CA | 1090550 A1 | 12/1980 |
| GB | 1 587 907 A | 4/1981 |
| JP | 1995097585 A | 4/1995 |
| JP | 1996245952 A | 9/1996 |
| JP | 1997316439 A | 12/1997 |
| WO | 97/16502 A1 | 5/1997 |
| WO | 98/08912 A1 | 3/1998 |
| WO | 2005/049759 A1 | 6/2005 |
| WO | 2005/083027 A1 | 9/2005 |

OTHER PUBLICATIONS

"Anti-Counterfeiting Measures," Rhodia Press Release; Released in the name of Neil Roberts, ISCEON(R) Sales & marketing Manager, Rhodia); Nov. 2001.
International Search Report, date of mailing: May 13, 2005.
Written Opinion of the International Searching Authority, date of mailing: May 13, 2005.
International Preliminary Report on Patentability, date of mailing: Jun. 2, 2006.
A. R. J. Andrews et al, The Separation of Hydrogen and Deuterium Homologues by Inclusion Gas Chromatography, Chromatographia, vol. 34, No. 9/10, Nov. 1992, pp. 457-460.

* cited by examiner

*Primary Examiner* — Gregory Webb

(57) ABSTRACT

The present invention relates to the field of compression refrigeration and air conditioning. Specifically, the present invention relates to a tracer-containing compositions comprising refrigeration/heating fluid and tracer compound(s). Additionally, the present invention relates to a method for detecting tracer compounds to identify gases after leaving the custody of the original manufacturer or prior source, and the verification of authenticity. The aforementioned method provides for the detection of tracer compounds, which in turn, may alert the refrigeration industry to when dilution, adulteration, contamination or other unauthorized practices have occurred with refrigeration products.

20 Claims, No Drawings

TRACER-CONTAINING COMPOSITIONS

CROSS REFERENCE(S) TO RELATED APPLICATION(S)

This application claims the priority benefit of and is a divisional of U.S. patent application Ser. No. 11/062,044, filed Feb. 18, 2005, now allowed, which claims priority benefit of U.S. Provisional Patent Application 60/548,085, filed Feb. 26, 2004, which is hereby incorporated herein by reference.

BACKGROUND OF THE INVENTION

1. Field of the Invention

The present invention relates to the field of compression refrigeration and air conditioning. Specifically, the present invention relates to a composition comprising refrigerant and tracer compound(s). Additionally, the present invention relates to a method for the identification of refrigerant gases after leaving the custody of the original manufacturer and the verification of refrigerant authenticity. The aforementioned method provides for the detection of tracer compounds, which in turn, may alert the refrigeration industry to the occurrence of dilution, adulteration, contamination or other unauthorized modification of refrigeration products.

2. Description of Related Art

Environmental concerns have led the refrigeration industry to high levels of consciousness around the responsible use of refrigerants. The refrigeration industry, as well as the society at large, benefits when everyone who manufactures, distributes, uses refrigerants, or services refrigeration and air conditioning equipment uses all applicable measures to keep equipment operating at the highest achievable level of energy efficiency. This reduces the amount of energy consumed by the equipment. Higher than necessary energy consumption, as well as leakage of refrigerants, can contribute to unnecessary pollution of our atmosphere and waste of existing resources. This unnecessary waste also comes at a cost to the consumer for replacement of leaked refrigerant.

In response to environmental concerns, manufacturers of refrigerants have developed new refrigerant products that allow higher levels of energy efficiency when used in properly designed equipment. The new generation HFC refrigerants have less impact on the environment than older generation chlorinated refrigerants in the event that they inadvertently leak into the atmosphere. The HFC refrigerants have zero ozone depletion potential, and in general have less tropospheric climate change potential than the refrigerants they replace. In addition, industry practices now mandate the elimination of leaks from most types of operating equipment, and require that refrigerant gas be recovered from equipment when that equipment is taken out of service or is opened to allow service work to be performed.

While the new high efficiency refrigerants and new responsible use policies are benefiting the environment, the benefit is not as great as it could be. In some instances, the recovered refrigerant gases are not properly reclaimed or recycled. The recovered refrigerant may be re-installed back into other pieces of equipment without being properly reclaimed and cleaned to remove any harmful or energy efficiency reducing impurities which may have been introduced in handling or as a result of poorly performing or damaged equipment. The equipment into which this refrigerant is introduced will then not operate at peak efficiency, and will consume more energy than necessary.

In addition, used refrigerant can be blended with virgin refrigerant, which generally results in a non-standard refrigerant gas composition.

Similarly, used refrigerant can be re-packaged and sold as virgin refrigerant, without certification of purity and quality. These practices may result in increased atmospheric pollution and increased energy use, and places expensive refrigeration hardware at risk of being damaged.

In addition to negative environmental and equipment impact, there are economic losses to the refrigerant manufacturers and distributors. Refrigerant manufacturers make significant investments into the development of the quality new refrigerants products. Refrigerant distributors similarly have invested in equipment for the proper protection of refrigerants from contamination during packaging, storage, and distribution of refrigerants When refrigerants are diluted or blended with recovered refrigerants, and sold as virgin refrigerant, manufacturers and distributors do not receive the benefit of their investment.

For the foregoing reasons, there has been a need for the ability to positively determine when a refrigerant composition is diluted or altered in any way, in a manner that does not compromise performance or the product properties to any measurable extent.

The present invention addresses this need by providing a highly secure way to label virgin refrigerant product.

BRIEF SUMMARY OF THE INVENTION

The present invention is directed to a tracer-containing refrigerant composition, said composition comprising a refrigeration/heating fluid and at least one tracer compound, said tracer compound being present and analytically detectable and being selected from the group consisting of hydrofluorocarbons, deuterated hydrofluorocarbons, perfluorocarbons, fluoroethers, brominated compounds, iodated compounds, alcohols, aldehydes and ketones, nitrous oxide and combinations thereof. Additionally, the present invention relates to a composition as stated above wherein at least one of said tracer compound is present as a single pre-determined isomer.

The present invention further relates to a method of using the present inventive tracer-containing refrigerant compositions, said method comprising combining said tracer compound with said refrigeration/heating fluid to make a tracer-containing refrigerant composition, and detecting the presence of said tracer compound in said tracer-containing refrigerant composition. Said method may comprise detecting the occurrence of dilution, adulteration or contamination of said composition.

Also, the present invention relates to use of the tracer-containing refrigerant composition in a method for producing refrigeration comprising evaporating said composition in the vicinity of a body to be cooled and thereafter condensing said composition. And the present invention additionally relates to a method of using the tracer-containing refrigerant composition for producing heat comprising condensing said composition in the vicinity of a body to be heated and thereafter evaporating said composition.

DETAILED DESCRIPTION OF THE INVENTION

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of upper range limit or preferred value and any lower range limit r preferred value, regardless of whether such ranges are separately disclosed. Where a range of numerical values is recited herein, unless otherwise stated, the range is intended to include the endpoints thereof, and all integers and fractions within the range. It is not intended that the scope of the present invention be limited to the specific values recited when defining a range.

The refrigeration/heating fluid of the present invention may be any common refrigeration/heating fluid used in the refrigeration industry. Such refrigeration/heating fluids may be hydrofluorocarbons (HFCs), hydrochlorofluorocarbons (HCFCs), perfluorocarbons (PFCs), fluorocarbon ethers (HFEs), hydrocarbons, carbon dioxide ($CO_2$), ammonia ($NH_3$), or mixtures thereof. The fluorinated refrigeration/ heating fluids, HFCs, HCFCs, HFEs and PFCs may be referred to as fluorocarbon refrigerants.

The fluorocarbon refrigerants of the present invention may have 1-8 carbon atoms, contain at least one fluorine atom, optionally contain chlorine and oxygen atoms, and have a normal boiling point of from −90° C. to 80° C. These fluorocarbons may be represented by the general formula $C_wF_{2w+2-x-y}H_xCl_yO_z$, wherein w is 1-6, x is 0-9, y is 0-3, and z is 0-2, and wherein 2w+2−x−y is a positive integer.

Preferred of the fluorocarbons are those in which w is 1-6, x is 1-5, y is 0-1, and z is 0-1. The present invention is particularly useful with hydrofluorocarbon and hydrochlorofluorocarbon-based refrigerants. Fluorocarbon refrigerants are commercial products available from a number of sources such as E.I. du Pont de Nemours & Co., Fluoroproducts, Wilmington, Del., 19898, USA, or are available from custom chemical synthesis companies such as PCR Inc., P.O. Box 1466, Gainesville, Fla., 32602, USA, and additionally by synthetic processes disclosed in publications such as Chemistry of Organic Fluorine Compounds $2^{nd}$ (revised edition), edited by Milos Hudlicky, published by Ellis Harwood-Prentice Hall Publishers, 1992. Representative fluorocarbons include but are not limited to: $CHClF_2$ (HCFC-22), $CHF_3$ (HFC-23), $CH_2F_2$ (HFC-32), $CH_3F$ (HFC-41), $CF_3CF_3$ (FC-116), $CHClFCF_3$ (HCFC-124), $CHF_2CF_3$ (HFC-125), $CH_2ClCF_3$ (HCFC-133a), $CHF_2CHF_2$ (HFC-134), $CH_2FCF_3$ (HFC-134a), $CClF_2CH_3$ (HCFC-142b), $CHF_2CH_2F$ (HFC-143), $CF_3CH_3$ (HFC-143a), $CHF_2CH_3$ (HFC-152a), $CHF_2CF_2CF_3$ (HFC-227ca), $CF_3CFHCF_3$ (HFC-227ea), $CHF_2CF_2CHF_2$ (HFC-236ca), $CH_2FCF_2CF_3$ (HFC-236cb), $CHF_2CHFCF_3$ (HFC-236ea), $CF_3CH_2CF_3$ (HFC-236fa), $CH_2FCF_2CHF_2$ (HFC-245ca), $CH_3CF_2CF_3$ (HFC-245cb), $CHF_2CHFCHF_2$ (HFC-245ea), $CH_2FCHFCF_3$ (HFC-245eb), $CHF_2CH_2CF_3$ (HFC-245fa), $CH_2FCF_2CH_2F$ (HFC-254ca), $CH_3CF_2CHF_2$ (HFC-254cb), $CH_2FCHFCHF_2$ (HFC-254ea), $CH_3CHFCF_3$ (HFC-254eb), $CHF_2CH_2CHF_2$ (HFC-254fa), $CH_2FCH_2CF_3$ (HFC-254fb), $CH_3CF_2CH_3$ (HFC-272ca), $CH_3CHFCH_2F$ (HFC-272ea), $CH_2FCH_2CH_2F$ (HFC-272fa), $CH_3CH_2CF_2H$ (HFC-272fb), $CH_3CHFCH_3$ (HFC-281ea), $CH_3CH_2CH_2F$ (HFC-281fa), $CHF_2CF_2CF_2H$(HFC-338 pcc), $CF_3CH_2CF_2CH_3$ (HFC-365mfc), $CF_3CF_2CF_2OCHFCF_3$ (Freon® E1), $CF_3CHFCHFCF_2CF_3$ (HFC-43-10mee), $C_4F_9OCH_3$, and $C_4F_9OC_2H_5$.

Additionally, the fluorocarbon refrigerants of the present invention may be represented by the general formula $C_wF_{2w-x}H_xO_z$, wherein w may equal 3 to 8 and x may equal 0-17 and z may equal 0 to 2, and wherein 2w−x is a positive integer. Such fluorocarbon refrigerants include unsaturated compounds and other functionalized fluorocarbons, such as $CF_3(CF_2)_3CH=CH_2$ (perfluorobutylethylene, PFBE), $CF_3CF_2C(O)CF(CF_3)_2$(perfluoroethylisopropylketone, PEIK), and $CF_3C(O)CF(CF_3)_2$(perfluoromethylisopropylketone, PMIK).

More preferred fluorocarbon refrigerants are the hydrofluorocarbon and hydrochlorofluorocarbon-based refrigerants, such as, $CHClF_2$ (HCFC-22), $CHF_3$ (HFC-23), $CH_2F_2$ (HFC-32), $CHClFCF_3$ (HCFC-124), $CHF_2CF_3$ (HFC-125), $CHF_2CHF_2$ (HFC-134), $CH_2FCF_3$ (HFC-134a), $CF_3CH_3$ (HFC-143a), $CHF_2CH_3$ (HFC-152a), $CHF_2CF_2CF_3$ (HFC-227ca), $CF_3CFHCF_3$ (HFC-227ea), $CF_3CH_2CF_3$ (HFC-236fa), $CHF_2CH_2CF_3$ (HFC-245fa), $CHF_2CF_2CF_2H$ (HFC-338 pcc), $CF_3CHFCHFCF_2CF_3$ (HFC-43-10mee), $CF_3(CF_2)_3CH=CH_2$ (perfluorobutylethylene, PFBE), $CF_3CF_2C(O)CF(CF_3)_2$ (perfluoroethylisopropylketone, PEIK), $CF_3C(O)CF(CF_3)_2$ (perfluoromethylisopropylketone, PMIK); and the azeotropic and azeotrope-like fluorocarbon refrigerant compositions, such as, HCFC-22/HFC-152a/HCFC-124 (known by the ASHRAE designations, R-401A, R-401B, and R-4010), HFC-125/HFC-143a/HFC-134a (known by the ASHRAE designation, R-404A), HFC-32/HFC-125/HFC-134a (known by ASHRAE designations, R-407A, R-407B, and R-4070), HCFC-22/HFC-143a/HFC-125 (known by the ASHRAE designation, R-408A), HCFC-22/HCFC-124/HCFC-142b (known by the ASHRAE designation: R-409A), HFC-32/HFC-125 (R-410A), and HFC-125/HFC-143a (known by the ASHRAE designation: R-507).

The fluorocarbon refrigerants of the present invention may optionally further comprise up to 10 weight percent of dimethyl ether, or at least one $C_3$ to $C_5$ hydrocarbon, e.g., propane, propylene, cyclopropane, n-butane, isobutane, n-pentane, cyclopentane and neopentane (2,2-dimethylpropane). Examples of fluorocarbons containing such $C_3$ to $C_5$ hydrocarbons are azeotrope-like compositions of HCFC-22/HFC-125/propane (known by the ASHRAE designation, R-402A and R-402B), HCFC-22/octafluoropropane/propane (known by the ASHRAE designation, R-403A and R-403B), octafluoropropane/HFC-134a/isobutane (known by the ASHRAE designation, R-413A), HCFC-22/HCFC-124/HCFC-142b/isobutane (known by the ASHRAE designation, R-414A and R-414B), HFC-134a/HCFC-124/n-butane (known by the ASHRAE designation, R-416A), HFC-125/HFC-134a/n-butane (known by the ASHRAE designation, R-417A), HFC-125/HFC-134a/dimethyl ether (known by the ASHRAE designation, R-419A), and HFC-125/HFC-134a/isobutane (known by ASHRAE designation, R-422A).

The tracer compound of the present invention is selected from the group consisting of hydrofluorocarbon, deuterated hydrocarbon or hydrofluorocarbon, perfluorocarbon, fluoroether, brominated compound, iodated compound, alcohol, aldehydes and ketone, nitrous oxide ($N_2O$) and combinations thereof. While there may be overlap between a defined chemical compound, which may be a refrigeration/heating fluid, and a chemical compound that may be defined as a tracer compound, the same compound may not serve as both elements of a given composition. Suitable tracer compound candidates are listed in Table 1.

TABLE 1

| Compound Name | Chemical Structure | CAS registry no. |
|---|---|---|
| Deuterated hydrocarbon or HFC compounds | | |
| Ethane-d6 | $CD_3—CD_3$ | 1632-99-1 |
| Propane-d8 | $CD_3—CD_2—CD_3$ | 2875-94-7 |
| HFC-32-d2 | $CD_2F_2$ | 594-24-1 |
| HFC-134a-d2 | $CD_2F—CF_3$ | 496024-52-3 |
| HFC-143a-d3 | $CD_3—CF_3$ | 558-59-8 |
| HFC-125-d | $CDF_2—CF_3$ | 87458-21-7 |
| HFC-227ea-d | $CF_3—CDF—CF_3$ | 119117-94-1 |
| HFC-227ca-d | $CF_3—CF_2—CDF_2$ | 662-02-2 |
| HFC-134-d2 | $CDF_2—CDF_2$ | 274689-13-3 |
| HFC-236fa-d2 | $CF_3—CD_2—CF_3$ | 72256-43-0 |
| HFC-245cb-d3 | $CF_3—CF_2—CD_3$ | 38878-30-7 |
| HFC-263fb-d2* | $CF_3—CD_2—CH_3$ | 7370-99-2 |
| HFC-263fb-d3 | $CF_2—CH_2—CD_3$ | 7371-43-9 |
| Fluoroethers | | |
| HFOC-125E | $CHF_2—O—CF_3$ | 3822-68-2 |
| HFOC-134aE | $CH_2F—O—CF_3$ | 2261-01-0 |
| HFOC-143aE | $CH_3—O—CF_3$ | 421-14-7 |
| HFOC-227eaE | $CF_3—O—CHF—CF_3$ | 2356-62-9 |
| HFOC-236faE | $CF_3—O—CH_2—CF_3$ | 20193-67-3 |
| HFOC-245faEβγ or HFOC-245faEαβ | $CHF_2—O—CH_2CF_3$ (or $CHF_2CH_2—O—CF_3$) | 1885-48-9 (or 84011-15-4) |
| HFOC-245cbEβγ or HFOC-245cbαβ | $CH_3—O—CF_2—CF_3$ (or $CH_3—CF_2—O—CF_3$) | 22410-44-2 (or |
| HFE-42-11mcc (or Freon ® E1) | $CF_3—CF_2—CF_2—O—CHF—CF_3$ | 3330-15-2 |
| Freon ® E2 | $CF_3—CF_2—CF_2—O—CF(CF3)CF_2—O—CHF—CF_3$ | 3330-14-1 |
| Hydrofluorocarbons | | |
| HFC-23 | $CHF_3$ | 75-46-7 |
| HFC-161 | $CH_3—CH_2F$ | 353-36-3 |
| HFC-152a | $CH_3—CHF_2$ | 75-37-6 |
| HFC-134 | $CHF_2—CHF_2$ | 359-35-3 |
| HFC-227ea | $CF_3—CHF—CF_3$ | 431-89-0 |
| HFC-227ca | $CHF_2—CF_2—CF_3$ | 2252-84-8 |
| HFC-236cb | $CH_2F—CF_2—CF_3$ | 677-56-5 |
| HFC-236ea | $CF_3—CHF—CHF_2$ | 431-63-0 |
| HFC-236fa | $CF_3—CH_2—CF_3$ | 690-39-1 |
| HFC-245cb | $CF_3—CF_2—CH_3$ | 1814-88-6 |
| HFC-245fa | $CHF_2—CH_2—CF_3$ | 460-73-1 |
| HFC-254cb | $CHF_2—CF_2—CH_3$ | 40723-63-5 |
| HFC-254eb | $CF_3—CHF—CH_3$ | 421-48-7 |
| HFC-263fb | $CF_3—CH_2—CH_3$ | 421-07-8 |
| HFC-272ca | $CH_3—CF_2—CH_3$ | 420-45-1 |
| HFC-281ea | $CH_3—CHF—CH_3$ | 420-26-8 |
| HFC-281fa | $CH_2F—CH_2—CH_3$ | 460-13-9 |
| HFC-329p | $CHF_2—CF_2CF_2CF_3$ | 375-17-7 |
| HFC-329mmz | $(CH_3)_2—CH—CF_3$ | 382-24-1 |
| HFC-338mf | $CF_3—CH_2—CF_2—CF_3$ | 2924-29-0 |
| HFC-338pcc | $CHF_2—CF_2—CF_2—CHF_2$ | 377-36-6 |
| HFC-347s | $CH_3—CF_2—CF_2—CF_3$ | 662-00-0 |
| HFC-43-10mee | $CF_3—CHF—CHF—CF_2—CF_3$ | 138495-42-8 |
| Perfluorocarbons | | |
| PFC-116 | $CF_3—CF_3$ | 76-16-4 |
| PFC-C216 | $Cyclo(—CF_2—CF_2—CF_2—)$ | 931-91-9 |
| PFC-218 | $CF_3CF_2CF_3$ | 76-19-7 |
| PFC-C318 | $Cyclo(—CF_2—CF_2—CF_2—CF_2—)$ | 115-25-3 |
| PFC-31-10mc | $CF_3—CF_2—CF_2—CF_3$ | 355-25-9 |
| PFC-31-10my | $(CF_2)_2CF—CF_3$ | 354-92-7 |
| PEC-C51-12mycm | $Cyclo(—CF(CF_3)—CF_2—CF(CF_3)—CF_2—)$ | 2994-71-0 |
| PEC-C51-12mym, trans | $Cyclo(—CF_2—CF(CF_3)—CF(CF_3)—CF_2—)$ | 1583-98-8 |
| PEC-C51-12mym, cis | $Cyclo(—CF_2—CF(CF_3)—CF(CF_3)—CF_2—)$ | 1583-97-7 |
| Perfluoromethylcyclopentane | $Cyclo(—CF_2—CF_2(CF_3)—CF_2—CF_2—CF_2—)$ | 1805-22-7 |
| Perfluoromethylcyclohexane | $Cyclo(—CF_2—CF_2(CF_3)—CF_2—CF_2—CF_2—CF_2—)$ | 355-02-2 |
| Perfluorodimethylcyclohexane (ortho, meta, or para) | $Cyclo(—CF_2—CF_2(CF_3)—CF_2—CF_2(CF_3)—CF_2—)$ | ortho-306-89-9 meta-335-27-3 para-374-77-6 |
| Perfluoroethylcyclohexane | $Cyclo(—CF_2—CF_2(CF_2CF_3)—CF_2—CF_2—CF_2—CF_2—)$ | 335-21-7 |

TABLE 1-continued

| Compound Name | Chemical Structure | CAS registry no. |
|---|---|---|
| Perfluoroindan | $C_9F_{10}$ (see structure below) 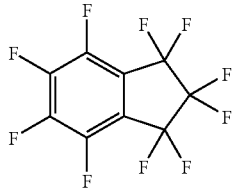 [SMILES: Fc1c(F)c(F)c2c(c1F)C(F)(F)C(F)(F)C2(F)F] | 1736-47-6 |
| Perfluorotrimethylcyclo-hexane (all possible isomers) | Cyclo(—$CF_2(CF_3)$—$CF_2(CF_3)$—$CF_2$—$CF_2(CF_3)$—$CF_2$—) | 374-76-5 |
| Perfluoroisopropylcyclo-hexane | Cyclo(—$CF_2CF_2(CF_2(CF_3)_2)CF_2CF_2CF_2CF_2$—) | 423-02-9 |
| Perfluorodecalin (cis or trans, trans shown) | $C_{10}F_{18}$ (see structure below) 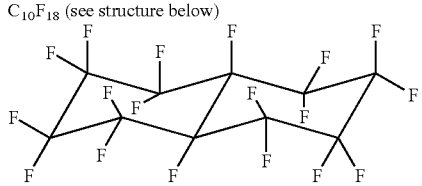 | 306-94-5 |
| Perfluoromethyldecalin (cis or trans and all additional possible isomers) | $C_{11}F_{20}$ (see structure below) 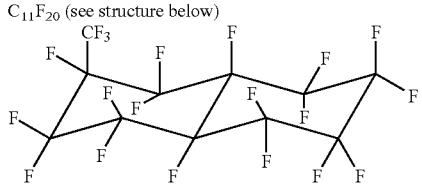 | 306-92-3 |
| Brominated Compounds | | |
| Bromomethane | $CH_3Br$ | 74-83-9 |
| Bromofluoromethane | $CH_2FBr$ | 373-52-4 |
| Bromodifluoromethane | $CHF_2Br$ | 1511-62-2 |
| Dibromofluoromethane | $CHFBr_2$ | 1868-53-7 |
| Tribromomethane | $CHBr_3$ | 75-25-2 |
| Bromoethane | $CH_3$—$CH_2Br$ | 74-96-4 |
| Bromoethene | $CH_2$=$CHBr$ | 593-60-2 |
| 1,2-dibromoethane | $CH_2Br$—$CH_2Br$ | 106-93-4 |
| 1-bromo-1,2-difluoroethene | $CFBr$=$CHF$ | 358-99-6 |
| Iodated compounds | | |
| Iodotrifluoromethane | $CF_3I$ | 2314-97-8 |
| Difluoroiodomethane | $CHF_2I$ | 1493-03-4 |
| Fluoroiodomethane | $CH_2FI$ | 373-53-5 |
| 1,1,2-trifluoro-1-iodoethane | $CF_2I$—$CH_2F$ | 20705-05-9 |
| 1,1,2,2-tetrafluoro-1-iodoethane | $CF_2I$—$CHF_2$ | 354-41-6 |
| 1,1,2,2-tetrafluoro-1,2-diiodoethane | $CF_2I$—$CF_2I$ | 354-65-4 |
| Iodopentafluorobenzene | $C_6F_5I$ | 827-15-6 |
| Alcohols | | |
| Ethanol | $CH_3$—$CH_2$—$OH$ | 64-17-5 |
| n-propanol | $CH_3$—$CH_2$—$CH_2$—$OH$ | 71-23-8 |
| Isopropanol | $CH_3$—$CH(OH)$—$CH_3$ | 67-63-0 |
| Aldehydes and Ketones | | |
| Acetone (2-propanone) | $CH_3$—$CO$—$CH_3$ | 67-64-1 |
| n-propanal | $CH_3$—$CH_2$—$CHO$ | 123-38-6 |
| n-butanal | $CH_3$—$CH_2$—$CH_2$—$CHO$ | 123-72-8 |
| Methyl ethyl ketone (2-butanone) | $CH_3$—$CO$—$CH_2$—$CH_3$ | 78-93-3 |
| Other | | |
| Nitrous oxide | $N_2O$ | 10024-97-2 |

The compounds listed in Table 1 are available commercially (from chemical supply houses, such as Aldrich, Milwaukee, Wis.) or may be prepared by processes known in the art.

Single tracer compounds may be used in combination with a refrigeration/heating fluid in the compositions of the present invention or multiple tracer compounds may be combined in any proportion to serve as a tracer blend. The tracer blend may contain multiple tracer compounds from the same class of compounds or multiple tracer compounds from different classes of compounds. For example, a tracer blend may contain 2 or more deuterated hydrofluorocarbons, or one deuterated hydrofluorocarbon in combination with one or more perfluorocarbons.

Additionally, some of the compounds in Table 1 exist as multiple isomers, structural or optical. Single isomers or multiple isomers of the same compound may be used in any proportion to prepare the tracer compound. Further, single or multiple isomers of a given compound may be combined in any proportion with any number of other compounds to serve as a tracer blend.

The tracer-containing refrigerant compositions of the present invention may be prepared by any convenient method to combine the desired amount of the individual components. A preferred method is to weigh the desired component amounts and thereafter combine the components in an appropriate vessel. Agitation may be used, if desired.

By "analytically detectable" is meant that the tracer or tracer blend may be detected by any analytical method capable of differentiating the tracer from the refrigeration/heating fluid or capable of determining the quantity of tracer present. In the case where a dilution of the tracer-containing composition may have occurred, the tracer compound may be present in a lesser quantity than originally added to the refrigeration/heating fluid. Analytical detection of the lesser quantity would aid the refrigeration industry. Such detection is capable of alerting the industry to the occurrence of dilution, adulteration, or contamination. Additionally, manufacturers, distributors and purchasers would be able to verify or authenticate the source (ie., supplier) of the refrigerant composition by comparing any quantity of detected tracer to the quantity that was intentionally combined with refrigeration/heating fluid by the source.

Gas chromatography (GC) is one analytical method that may be used to detect and quantify the tracer or tracer blend in the refrigeration/heating fluid. Any GC detector may be used that is capable of detecting and quantifying the tracer compound. Such detectors include, but are not limited, to flame ionization detector (FID), thermal conductivity detector (TCD), electron-capture detector (ECD), photo-ionization detector (PID), infrared detectors (IRD) and mass spectrometer detectors (usually referred to as GC-MS when combined with a gas chromatograph). Other analytical methods may be utilized which do not require the gas chromatographic separation prior to detection. Such additional analytical methods include but are not limited to nuclear magnetic resonance (NMR) or infrared (IR) spectrometry.

When mixtures of this invention are analyzed using gas chromatography, conditions capable of identifying and quantifying the tracer in the presence of the refrigeration/heating fluid may be used. The GC column used for the analysis must be chosen so as to be capable of separating the tracer compound or components of the tracer blend from the refrigeration/heating fluid. Both packed and capillary GC columns may be used. The preferred GC columns are those known to provide separation of fluorocarbon compounds from each other and classes of candidate tracer compounds of the present invention.

The packed GC columns that may be useful in the present invention are from about 1 meter to about 12 meters in length. Generally, packed GC columns are constructed of stainless steel. The commercially available packed GC columns that may be useful in the present invention include but are not limited to: porous polymer stationary phase, such as Porapak® Q or Porapak® T; silicone polymer stationary phases, such as SP®-1000 on Carbopack® B support or SP®-2100 (methyl silicone) on Supelcoport® support, perfluorinated polymer stationary phase, Fluorcol® on Carbopack® B support; and polyethylene glycol stationary phases, such as Carbowax® on Carbopack® C support. For those packed GC columns that are packed with a polymer coated support, the polymer loading may range from about 0.1% to about 10%. Packed GC columns listed here are available from Supelco (Bellefonte, Pa.).

Capillary GC columns which are found useful in the present invention are available commercially. Capillary columns may vary in length from about 10 meters to about 105 meters, but may also be longer if two or more columns are joined together (e.g. 120 meters by joining two 60 meter capillary GC columns). The capillary GC columns that may be of use in the present invention are generally constructed of fused silica tubing and vary in inner diameter (ID) from about 0.1 millimeter to about 0.53 millimeter. The stationary phase for the capillary GC columns is coated on the interior surface of the column and may vary in thickness from about 0.1 micrometer to about 5 micrometers. The stationary phases that may be of use in the present invention, include but are not limited to the commercially available liquid polymer phases: $RT_x$®-1 ((Crossbond® 100% dimethyl polysiloxane), $RT_x$®-200 (Crossbond® trifluoropropylmethyl polysiloxane), $RT_x$®-1301 (Crossbond® 6% cyanopropylphenyl/94% dimethyl polysiloxane), $RT_x$®-1701 (Crossbond® 14% cyanopropylphenyl/86% dimethyl polysiloxane) from Restek Corporation (Bellefonte, Pa.). Porous layer open tubular (PLOT) capillary columns may also be useful in the present invention. Such PLOT capillary GC columns include, but are not limited to, the CP-PoraPLOT® Q (100% styrene divinylbenzene) column from Varian Chrompack (Middelburg, The Netherlands).

Temperature and pressure conditions for the GC analysis will vary depending upon the refrigeration/heating fluid and the tracer being used in the composition. Cryogenic temperatures (sub-ambient, requiring liquid nitrogen, dry ice or liquid carbon dioxide) may be used in order to provide separation of low boiling components (either refrigeration/heating fluid or tracer compound(s)), when necessary.

Tracer compounds or blends may be present in concentrations that are detectable by whichever analytical method is chosen. Additionally, the tracer concentration must be chosen such that the quantity of tracer or tracer blend does not interfere with the performance of the refrigeration/heating fluid. The tracer compound or tracer blend may be present at a total concentration of about 50 parts per million by weight (ppm) to about 1000 ppm. Preferably, the tracer compound or tracer blend is present at a total concentration of about 50 ppm to about 500 ppm and most preferably, the tracer compound or tracer blend is present at a total concentration of about 100 ppm to about 300 ppm.

The present invention further relates to a method of using the present inventive tracer-containing refrigerant compositions, said method comprising combining said tracer compound with said refrigeration/heating fluid to make a tracer-containing refrigerant composition, and detecting the presence of said tracer compound in said tracer-containing refrigerant composition. The present method is useful to (i) determine the occurrence of dilution, adulteration or contamination or (ii) verify the source of the refrigerant composition of said composition.

The present invention further relates to a method of using the present inventive tracer-containing refrigerant composition, said method comprising: (i) producing refrigeration by evaporating the tracer-containing refrigerant composition in the vicinity of a body to be cooled and thereafter condensing said composition; or (ii) producing heat by condensing the tracer-containing refrigerant composition in the vicinity of the body to be heated and thereafter evaporating said composition.

Vapor-compression refrigeration systems include an evaporator, a compressor, a condenser, a liquid storage receiver and an expansion device. A vapor-compression cycle re-uses refrigerant in multiple steps producing a cooling effect in one step and a heating effect in a different step. The cycle can be described simply as follows. Liquid refrigerant enters an evaporator through an expansion device, and the liquid refrigerant boils in the evaporator at a low temperature to form a gas and produce cooling. The low-pressure gas enters a compressor where the gas is compressed to raise its pressure and temperature. The high-pressure gaseous refrigerant then enters the condenser in which the refrigerant condenses and discharges its heat to the environment. The refrigerant returns to the expansion device through which the liquid expands from the high-pressure level in the condenser to the low-pressure level in the evaporator, thus repeating the cycle.

EXAMPLES

Tracer-containing refrigerant compositions of the present invention were prepared and then analyzed using several different GC columns under differing conditions of analysis. The retention times for the refrigeration/heating fluid and tracer compounds were determined and are given for each example. It should be noted that exact retention times determined on a specific gas chromatograph and with a specific GC column will vary slightly from retention times determined from a different instrument and column.

All samples were analyzed on Agilent 6890 Gas Chromatographs and the data collected and processed by Agilent Chemstation® software, both available from Agilent Technologies (Palo Alto, Calif.).

Example 1

A sample of R-22 (refrigerant HCFC-22, chlorodifluoromethane) was spiked with 100 parts per million (ppm by weight) of PFC-C318 (perfluorocyclobutane). The sample was then analyzed by GC using the conditions described below:

Column: $RT_x$®-1701 (Crossbond® 14% cyanopropylphenyl/86% dimethyl polysiloxane)

| Length: | 105 meters |
|---|---|
| Inner diameter: | 0.25 millimeters |
| Stationary phase film thickness: | 0.25 micrometers |

Carrier gas and flow rate: He, 1.0 milliliter/minute

Oven temperature:

| Initial temperature: | −20° C. |
|---|---|
| Initial hold time: | 15 minutes |
| Temperature ramp rate: | 10° C./minute |
| Final temperature: | 50° C. |
| Final hold time: | 0 minutes (no final hold time) |

Detector: Flame ionization detector (FID)

| Temperature: | 250° C. |
|---|---|
| Hydrogen flow rate: | 42 milliliter/minute |
| Airflow rate: | 450 milliliter/minute |

Injection port: Split

| Temperature: | 150° C. |
|---|---|
| Head pressure: | 22 psi |
| Sample type: | vapor, manual syringe injection |
| Sample size: | 1.0 milliliter |
| Split ratio: | 50:1 |

The retention times for the refrigerant, R-22, and tracer, PFC-C318, are given in Table 2.

TABLE 2

| Compound | Retention time ($R_t$, minutes) |
|---|---|
| PFC-C318 (tracer) | 11.07 |
| R-22 (refrigerant) | 12.53 |

Example 2

A sample of R-134a (refrigerant HFC-134a, 1,1,1,2-tetrafluoroethane) was spiked with 100 parts per million (ppm by weight) of HFC-236fa (1,1,1,3,3,3-hexafluoropropane). The sample was then analyzed by GC using the conditions described below:

Column: $RT_x$-1® (Crossbond® 100% dimethyl polysiloxane)

| Length: | 105 meters |
|---|---|
| Inner diameter: | 0.25 millimeters |
| Stationary phase film thickness: | 1.0 micrometers |

Carrier gas and flow rate: helium, 0.75 milliliter/minute

Oven temperature:

| Initial temperature: | −20° C. |
|---|---|
| Initial hold time: | 13 minutes |
| Temperature ramp rate: | 5° C./minute |
| Final temperature: | 50° C. |
| Final hold time: | 10 minutes |

Detector: Flame ionization detector (FID)

| Temperature: | 250° C. |
|---|---|
| Hydrogen pressure: | 20 psi |
| Air pressure: | 45 psi |

Injection port: Split

| Temperature: | 175° C. |
|---|---|
| Head pressure: | 38 psi |
| Sample type: | vapor, manual syringe injection |
| Sample size: | 1.0 milliliter |
| Split ratio: | 75:1 |

The retention times for the refrigerant, R-134a, and tracer, HFC-236fa, are given in Table 3.

TABLE 3

| Compound | Retention time ($R_t$, minutes) |
|---|---|
| R-134a (refrigerant) | 10.76 |
| HFC-236fa (tracer) | 12.04 |

Example 3

A sample of R-410A (refrigerant blend, 50 weight percent R-32, difluoromethane, and 50 weight percent R-125, pentafluoroethane) was spiked with 100 parts per million (ppm by weight) of HFE-236fa (1-trifluoromethoxy-2,2,2-trifluoroethane). The sample was then analyzed by GC using the conditions described below:

Column: 5% Fluorcol® on Carbopack® B, 60/80 mesh

| Length: | 20 feet (6.1 meters) |
|---|---|
| Diameter: | ⅛ inch (0.32 centimeter) |

Carrier gas and flow rate: helium, 30 milliliter/minute
Oven temperature:

| Initial temperature: | 60° C. |
|---|---|
| Initial hold time: | 3 minutes |
| Temperature ramp rate: | 8° C./minute |
| Final temperature: | 180° C. |
| Final hold time: | 10 minutes |

Detector: flame ionization detector (FID)

| Temperature: | 250° C. |
|---|---|
| Hydrogen pressure: | 20 psi |
| Air pressure: | 45 psi |

Injection port: Packed

| Temperature: | 250° C. |
|---|---|
| Head pressure: | 67 psi |
| Sample type: | vapor, sample valve injection |
| Sample size: | 50 microliter |

The retention times for the refrigerant, R-410A or specifically, R-32 and R-125, and tracer, HFE-236fa, are given in Table 4.

TABLE 4

| Compound | Retention time ($R_t$, minutes) |
|---|---|
| R-32 (refrigerant) | 2.52 |
| R-125 (refrigerant) | 3.90 |
| HFE-236fa (tracer) | 10.87 |

What is claimed is:

1. A tracer-containing composition, comprising:
   (a) a refrigeration/heating fluid; and
   (b) from about 50 ppm to about 1000 ppm total of an analytically detectable tracer blend comprising (i) at least one tracer compound selected from the group consisting of brominated compounds and iodated compounds, and (ii) at least one tracer compound selected from the group consisting of perfluorocarbons; with the proviso that said refrigeration/heating fluid is different from said tracer.

2. The tracer-containing composition according to claim 1, wherein said refrigeration/heating fluid comprises at least one compound selected from the group consisting of hydrofluorocarbons, hydrochlorofluorocarbons, perfluorocarbons, fluorocarbon ethers, hydrocarbons, carbon dioxide, and ammonia.

3. The tracer-containing composition according to claim 1, wherein said composition comprises a compound of the formula $C_wF_{2w-x}H_xO_z$, wherein w is from 3 to 8, x is from 0 to 17, z is from 0 to 2, and 2w–x is a positive integer.

4. The tracer-containing composition according to claim 1, wherein said composition comprises a tracer blend in an amount ranging from about 50 ppm to about 500 ppm.

5. The tracer-containing composition according to claim 1, wherein the tracer blend comprises (i) at least one compound selected from bromomethane, bromofluoromethane, bromodifluoromethane, dibromofluoromethane, tribromomethane, bromoethane, bromoethene, 1,2-dibromoethane, 1-bromo-1,2-difluoroethene, iodotrifluoromethane, difluoroiodomethane, fluoroiodomethane, 1,1,2-trifluoro-1-iodoethane, 1,1,2,2-tetrafluoro-1-iodoethane, 1,1,2,2-tetrafluoro-1,2-diiodoethane, and iodopentafluorobenzene, and (ii) at least one compound selected from the group consisting of PFC-116, PFC-C216, PFC-218, PFC-C318, PFC-31-10mc, PFC-31-10my, trans-PFC-C51-12mym, cis-PFC-C51-12mym, perfluoromethylcyclopentane, ortho-perfluorodimethylcyclohexane, meta-perfluorodimethylcyclohexane, para-perfluorodimethylcyclohexane, perfluoroethylcyclohexane, perfluoroindan, perfluorotrimethylcyclohexane, perfluoroisopropylcyclohexane, cis-perfluorodecalin, trans-perfluorodecalin and perfluoromethyldecalin.

6. The tracer-containing composition according to claim 2, wherein said refrigeration/heating fluid is selected from the group consisting of HCFC-22, HFC-23, HFC-32, HFC-41, FC-116, HCFC-124, HFC-125, HCFC-133a, HFC-134, HFC-134a, HCFC-142b, HFC-143, HFC-143a, HFC-152a, HFC-227ca, HFC-227ea, HFC-236ca, HFC-236cb, HFC-236ea, HFC-236fa, HFC-245ca, HFC-245cb, HFC-245ea, HFC-245eb, HFC-245fa, HFC-254ca, HFC-254cb, HFC-254ea, HFC-254eb, HFC-254fa, HFC-254fb, HFC-272ca, HFC-272ea, HFC-272fa, HFC-272fb, HFC-281 ea, HFC-281 fa, HFC-338 pcc, HFC-365mfc, $CF_3CF_2CF_2OCHFCF_3$, HFC-43-10mee, dimethyl ether, propane, propylene, cyclopropane, n-butane, isobutane, n-pentane, cyclopentane, 2,2-dimethylpropane, $C_4F_9OCH_3$, $C_4F_9OC_2H_5$, perfluorobutylethylene, perfluoroethylisopropylketone, perfluoromethylisopropylketone, and mixtures thereof.

7. The tracer containing composition according to claim 3, wherein said refrigeration/heating fluid comprises an unsaturated compound of said formula, wherein w is 3.

8. A method for verifying the source of a refrigeration/heating fluid comprising (a) combining a quantity of (i) at least one tracer compound selected from the group consisting of brominated compounds and iodated compounds, and (ii) at least one tracer compound selected from the group consisting of perfluorocarbons with a refrigeration/heating fluid from a source, with the proviso that said refrigeration/heating fluid is different from said tracer compounds, to form a tracer-containing composition of claim 1;
(b) detecting the presence of said tracer compounds in a refrigeration/heating fluid selected for verification; and
(c) comparing any quantity of detected tracer to the quantity of tracer compounds combined in (a) to verify whether the selected refrigeration/heating fluid corresponds to the refrigeration/heating fluid from the source.

9. The method according to claim 8, wherein the refrigeration/heating fluid from the source comprises at least one compound selected from the group consisting of hydrofluorocarbons, hydrochlorofluorocarbons, perfluorocarbons, fluorocarbon ethers, hydrocarbons, carbon dioxide, and ammonia.

10. The method according to claim 8, wherein the refrigeration/heating fluid from the source comprises an unsaturated compound of the formula $C_wF_{2w-x}H_xO_z$, wherein w is from 3 to 8, x is from 0 to 17, z is from 0 to 2, and 2w-x is a positive integer.

11. The method according to claim 8, wherein the tracer compounds comprise (i) at least one compound selected from bromomethane, bromofluoromethane, bromodifluoromethane, dibromofluoromethane, tribromomethane, bromoethane, bromoethene, 1,2-dibromoethane, 1-bromo-1,2-difluoroethene, iodotrifluoromethane, difluoroiodomethane, fluoroiodomethane, 1,1,2-trifluoro-1-iodoethane, 1,1,2,2-tetrafluoro-1-iodoethane, 1,1,2,2-tetrafluoro-1,2-diiodoethane, and iodopentafluorobenzene, and (ii) at least one compound selected from the group consisting of PFC-116, PFC-C216, PFC-218, PFC-C318, PFC-31-10mc, PFC-31-10my, trans-PFC-C51-12mym, cis-PFC-C51-12mym, perfluoromethylcyclopentane, ortho-perfluorodimethylcyclohexane, meta-perfluorodimethylcyclohexane, para-perfluorodimethylcyclohexane, perfluoroethylcyclohexane, perfluoroindan, perfluorotrimethylcyclohexane, perfluoroisopropylcyclohexane, cis-perfluorodecalin, trans-perfluorodecalin and perfluoromethyldecalin.

12. The method according to claim 9, wherein said refrigeration/heating fluid from the source is selected from the group consisting of HCFC-22, HFC-23, HFC-32, HFC-41, FC-116, HCFC-124, HFC-125, HCFC-133a, HFC-134, HFC-134a, HCFC-142b, HFC-143, HFC-143a, HFC-152a, HFC-227ca, HFC-227ea, HFC-236ca, HFC-236cb, HFC-236ea, HFC-236fa, HFC-245ca, HFC-245cb, HFC-245ea, HFC-245eb, HFC-245fa, HFC-254ca, HFC-254cb, HFC-254ea, HFC-254eb, HFC-254fa, HFC-254fb, HFC-272ca, HFC-272ea, HFC-272fa, HFC-272fb, HFC-281 ea, HFC-281 fa, HFC-338 pcc, HFC-365mfc, $CF_3CF_2CF_2OCHFCF_3$, HFC-43-10mee, dimethyl ether, propane, propylene, cyclopropane, n-butane, isobutane, n-pentane, cyclopentane, 2,2-dimethylpropane, $C_4F_9OCH_3$, $C_4F_9OC_2H_5$, perfluorobutylethylene, perfluoroethylisopropylketone, perfluoromethylisopropylketone, and mixtures thereof.

13. A method for determining the occurrence of dilution of a composition comprising a refrigeration/heating fluid comprising: (a) combining (i) at least one tracer compound selected from the group consisting of brominated compounds and iodated compounds, and (ii) at least one tracer compound selected from the group consisting of perfluorocarbons with said refrigeration/heating fluid to form a tracer-containing composition of claim 1; and (b) detecting the presence of said tracer blend in a lesser quantity than originally added to said refrigeration/heating fluid.

14. The method according to claim 13, wherein the refrigeration/heating fluid comprises an unsaturated compound of the formula $C_wF_{2w-x}H_xO_z$, wherein w is from 3 to 8, x is from 0 to 17, z is from 0 to 2, and 2w-x is a positive integer.

15. The method according to claim 13, wherein said refrigeration/heating fluid is selected from the group consisting of HCFC-22, HFC-23, HFC-32, HFC-41, FC-116, HCFC-124, HFC-125, HCFC-133a, HFC-134, HFC-134a, HCFC-142b, HFC-143, HFC-143a, HFC-152a, HFC-227ca, HFC-227ea, HFC-236ca, HFC-236cb, HFC-236ea, HFC-236fa, HFC-245ca, HFC-245cb, HFC-245ea, HFC-245eb, HFC-245fa, HFC-254ca, HFC-254cb, HFC-254ea, HFC-254eb, HFC-254fa, HFC-254fb, HFC-272ca, HFC-272ea, HFC-272fa, HFC-272fb, HFC-281ea, HFC-281fa, HFC-338 pcc, HFC-365mfc, $CF_3CF_2CF_2OCHFCF_3$, HFC-43-10mee, dimethyl ether, propane, propylene, cyclopropane, n-butane, isobutane, n-pentane, cyclopentane, 2,2-dimethylpropane, $C_4F_9OCH_3$, $C_4F_9OC_2H_5$, perfluorobutylethylene, perfluoroethylisopropylketone, perfluoromethylisopropylketone, and mixtures thereof.

16. The method according to claim 13, wherein the tracer composition comprises (i) at least one compound selected from bromomethane, bromofluoromethane, bromodifluoromethane, dibromofluoromethane, tribromomethane, bromoethane, bromoethene, 1,2-dibromoethane, 1-bromo-1,2-difluoroethene, iodotrifluoromethane, difluoroiodomethane, fluoroiodomethane, 1,1,2-trifluoro-1-iodoethane, 1,1,2,2-tetrafluoro-1-iodoethane, 1,1,2,2-tetrafluoro-1,2-diiodoethane, and iodopentafluorobenzene, and optionally (ii) at least one compound selected from the group consisting of PFC-116, PFC-C216, PFC-218, PFC-C318, PFC-31-10mc, PFC-31-10my, trans-PFC-C51-12mym, cis-PFC-C51-12mym, perfluoromethylcyclopentane, ortho-perfluorodimethylcyclohexane, meta-perfluorodimethylcyclohexane, para-perfluorodimethylcyclohexane, perfluoroethylcyclohexane, perfluoroindan, perfluorotrimethylcyclohexane, perfluoroisopropylcyclohexane, cis-perfluorodecalin, trans-perfluorodecalin and perfluoromethyldecal in.

17. A tracer-containing composition, comprising:
(a) a refrigeration/heating fluid comprising an unsaturated compound of the formula $C_wF_{2w-x}H_xO_z$, wherein w is from 3 to 8, z is from 0 to 2, and 2w-x is a positive integer; and
(b) up to about 1000 ppm total of an analytically detectable tracer blend comprising (i) at least one tracer compound selected from the group consisting of brominated compounds and iodated compounds, and (ii) at least one tracer compound selected from the group consisting of perfluorocarbons; with the proviso that said refrigeration/heating fluid is different from said tracer.

18. The tracer-containing composition of claim 17, wherein z is zero.

19. The tracer-containing composition of claim 18, wherein the refrigeration/heating fluid comprises perfluorobutylethylene.

20. The tracer-containing composition of claim 17 wherein w is 3.

* * * * *